US009015688B2

(12) United States Patent
Tian et al.

(10) Patent No.: US 9,015,688 B2
(45) Date of Patent: Apr. 21, 2015

(54) VECTORIZATION OF SCALAR FUNCTIONS INCLUDING VECTORIZATION ANNOTATIONS AND VECTORIZED FUNCTION SIGNATURES MATCHING

(75) Inventors: Xinmin Tian, Union City, CA (US); Sergey Stanislavoich Kozhukhov, Novosibirsk (RU); Sergey Victorovich Preis, Novosibirsk (RU); Robert Yehuda Geva, Cupertino, CA (US); Konstantin Anatolyevich Pyjov, Novosibirsk (RU); Hideki Sato, Sunnyvale, CA (US); Milind Baburao Girkar, Sunnyvale, CA (US); Aleksei Gurievich Kasov, Novosibirsk (RU); Nikolay Vladimirovich Panchenko, Novosibirsk (RU)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/995,482

(22) PCT Filed: Apr. 1, 2011

(86) PCT No.: PCT/RU2011/000212
§ 371 (c)(1),
(2), (4) Date: Aug. 9, 2013

(87) PCT Pub. No.: WO2012/134322
PCT Pub. Date: Oct. 4, 2012

(65) Prior Publication Data
US 2013/0318511 A1 Nov. 28, 2013

(51) Int. Cl.
*G06F 9/45* (2006.01)
*G06F 9/445* (2006.01)

(52) U.S. Cl.
CPC ............... *G06F 8/443* (2013.01); *G06F 8/447* (2013.01); *G06F 8/54* (2013.01)

(58) Field of Classification Search
USPC .................................................. 717/149–160
IPC ....... G06F 15/8007,15/8038, 15/8053, 15/8092, G06F 815/8007, 815/8038, 9/3851, 8/41
See application file for complete search history.

(56) References Cited

U.S. PATENT DOCUMENTS 5,708,836 A * 1/1998 Wilkinson et al. .............. 712/20
5,710,935 A * 1/1998 Barker et al. .................... 712/20
(Continued)

OTHER PUBLICATIONS

Ke et al, "Safe Parallel Programming using Dynamic Dependence Hints", ACM, pp. 243-258, 2011.*
(Continued)

*Primary Examiner* — Anil Khatri
(74) *Attorney, Agent, or Firm* — Schwabe, Williamson & Wyatt, P.C.

(57) ABSTRACT

Methods and apparatuses associated with vectorization of scalar callee functions are disclosed herein. In various embodiments, compiling a first program may include generating one or more vectorized versions of a scalar callee function of the first program, based at least in part on vectorization annotations of the first program. Additionally, compiling may include generating one or more vectorized function signatures respectively associated with the one or more vectorized versions of the scalar callee function. The one or more vectorized function signatures may enable an appropriate vectorized version of the scalar callee function to be matched and invoked for a generic call from a caller function of a second program to a vectorized version of the scalar callee function.

20 Claims, 6 Drawing Sheets

(56) References Cited

U.S. PATENT DOCUMENTS

| | | | | |
|---|---|---|---|---|
| 5,768,596 | A * | 6/1998 | Chow et al. | 717/154 |
| 6,088,511 | A * | 7/2000 | Hardwick | 717/149 |
| 7,376,941 | B2 * | 5/2008 | Allen | 717/157 |
| 7,681,187 | B2 * | 3/2010 | Ludwig et al. | 717/151 |
| 7,840,954 | B2 * | 11/2010 | Gschwind | 717/159 |
| 8,108,846 | B2 * | 1/2012 | Gschwind | 717/149 |
| 8,201,159 | B2 * | 6/2012 | Gschwind | 717/154 |
| 8,250,549 | B2 * | 8/2012 | Reid et al. | 717/149 |
| 8,327,344 | B2 * | 12/2012 | Gschwind | 717/160 |
| 8,381,202 | B2 * | 2/2013 | Papakipos et al. | 717/149 |
| 8,505,002 | B2 * | 8/2013 | Yehia et al. | 717/149 |
| 8,621,448 | B2 * | 12/2013 | Gonion | 717/157 |
| 8,677,338 | B2 * | 3/2014 | Ng et al. | 717/160 |

OTHER PUBLICATIONS

Nuzman et al, "Auto-Vectorization of Interleaved Data for SIMD", ACM, pp. 132-143, 2006.*

Mustafa et al, "Portable Section-level Tuning of Compiler Parallelized Applications", IEEE, pp. 1-11, 2012.*

Zhao et al, "Reducing Task Creation and Termination Overhead in Explicitly Parallel Programs" ACM, pp. 169-180, 2010.*

Klemm M., "Loop Independence, Compiler Vectorization and Threading of Loops (SSE & AVX)", Internet citation, Dec. 7, 2010, XP0026651, retrieved from the Internet:URL:http//www.rz.rwth-aachen.de/global/show_document asp?id=aaaaaaaaaaccilf.

Intel Corporation: "Intel C++ Complier XE 12.0 User and Reference Guides", Internet citation, Nov. 7, 2010, pp. 1-29, XP002665199, Retrieved from the Internet: URL:http://software.intel.com/sites/products/documentation/hpc/composerxe/en-us/cpp/mac/main/main_cover.htm.

Anonymous: "Name mangling", Wikipedia, Mar. 15, 2011, pp. 1-11, XP002665200, Retrieved from the Internet: URL:http://en.wikipedia.org/w/index.php?title=Name_mangling&oldid+418898690.

Anonymous: "Intel C++ Compiler", Wikipedia, Oct. 23, 2011, pp. 1-5, XP002665201, Retrieved from the Internet: URL:http//en.wikipedia.org/wiki/Intel_C%2B%2B_Complier.

Anonymous: "HPC December Workshop 2010 Part I: HPC Tuning Workshop", Internet citation, Dec. 2010, pp. 1-5, XP002665202, Retrieved from the Internet: URL:http://www.rz.rwth-aachen.de/aw/tdt/Tuning_Workshop/?lang=en.

International Search Report and Written Opinion mailed Dec. 28, 2011 for International Application No. PCT/RU2011/000212, 13 pages.

Office Action mailed Oct. 22, 2014 for Taiwan Patent Application No. 101111469, 15 pages.

* cited by examiner

Parser/Tokenizer 202
- Logic to parse/tokenize source code ~212
++ logic to parse/tokenize Vectorization Annotation(s) ~214

Analyzer 204
- Logic to analyze program being compiled ~216
- Logic to generate call graph and/or execution profile ~218
- Logic to perform inter-procedural analysis ~220
++ logic to determine conditional and/or recursive calls ~222
++ logic to identify struct and multi-dimension array accesses ~224

Code Generator 206
- Logic to generate executable code ~226

Optimizer 208
- Logic to optimize generated code ~228
++ Logic to vectorize scalar functions ~230
-- logic to generate masked versions ~232
++ logic to perform inter-procedural optimization ~234
--- logic to transform struct and multi-dimension array memory accesses into unit-stride memory accesses ~236

*FIG.2*

| Original Name 402 | SIMD Prefix 404 | Processor Target 406 | Vector Length 408 | Mask 410 | Linear Step 412 | ... |

FIG.4

VECTORIZATION OF SCALAR FUNCTIONS INCLUDING VECTORIZATION ANNOTATIONS AND VECTORIZED FUNCTION SIGNATURES MATCHING

CROSS REFERENCE TO RELATED APPLICATIONS

The present application is a national phase entry under 35 U.S.C. §371 of International Application No. PCT/RU2011/000212, filed Apr. 1, 2011, entitled "VECTORIZATION OF SCALAR FUNCTIONS INCLUDING VECTORIZATION ANNOTATIONS AND VECTORIZED FUNCTION SIGNATURES MATCHING", which designated, among the various States, the United States of America. The Specification of the PCT/RU2011/000212 Application is hereby incorporated by reference.

TECHNICAL FIELD

Embodiments of the present disclosure relate to the field of data processing, in particular, to methods, apparatuses and articles associated with vectorization of scalar functions, including vectorization annotations and vectorized function signatures generation and matching. Embodiments may also include inter-procedural analysis.

BACKGROUND

Unless otherwise indicated herein, the materials described in the background section are not prior art to the claims in this application and are not admitted to be prior art by inclusion in the background section.

With advances in electronics, integrated circuit, computing and networking technologies, applications, such as, but not limited to, multimedia applications or scientific computing, have become more computational intensive. Vector or Single Instruction Multiple Data (SIMD) computing generally offers improved execution performance over scalar computing. Thus, vectorization of scalar functions of the computational intensive applications enables increased exploitation of the parallelism offered by vector or SIMD computing, by these computational intensive applications.

BRIEF DESCRIPTION OF THE DRAWING

Embodiments of the present disclosure will be presented by way of exemplary embodiments, but not limitations, illustrated in the accompanying drawings in which like references denote similar elements, and in which:

FIG. 2 illustrates the compiler of FIG. 1 configured to practice vectorization of scalar functions, in accordance with various embodiments of the present disclosure;

FIG. 4 illustrates a vectorized function signature, in accordance with various embodiments of the present disclosure;

DETAILED DESCRIPTION

Figure 1:
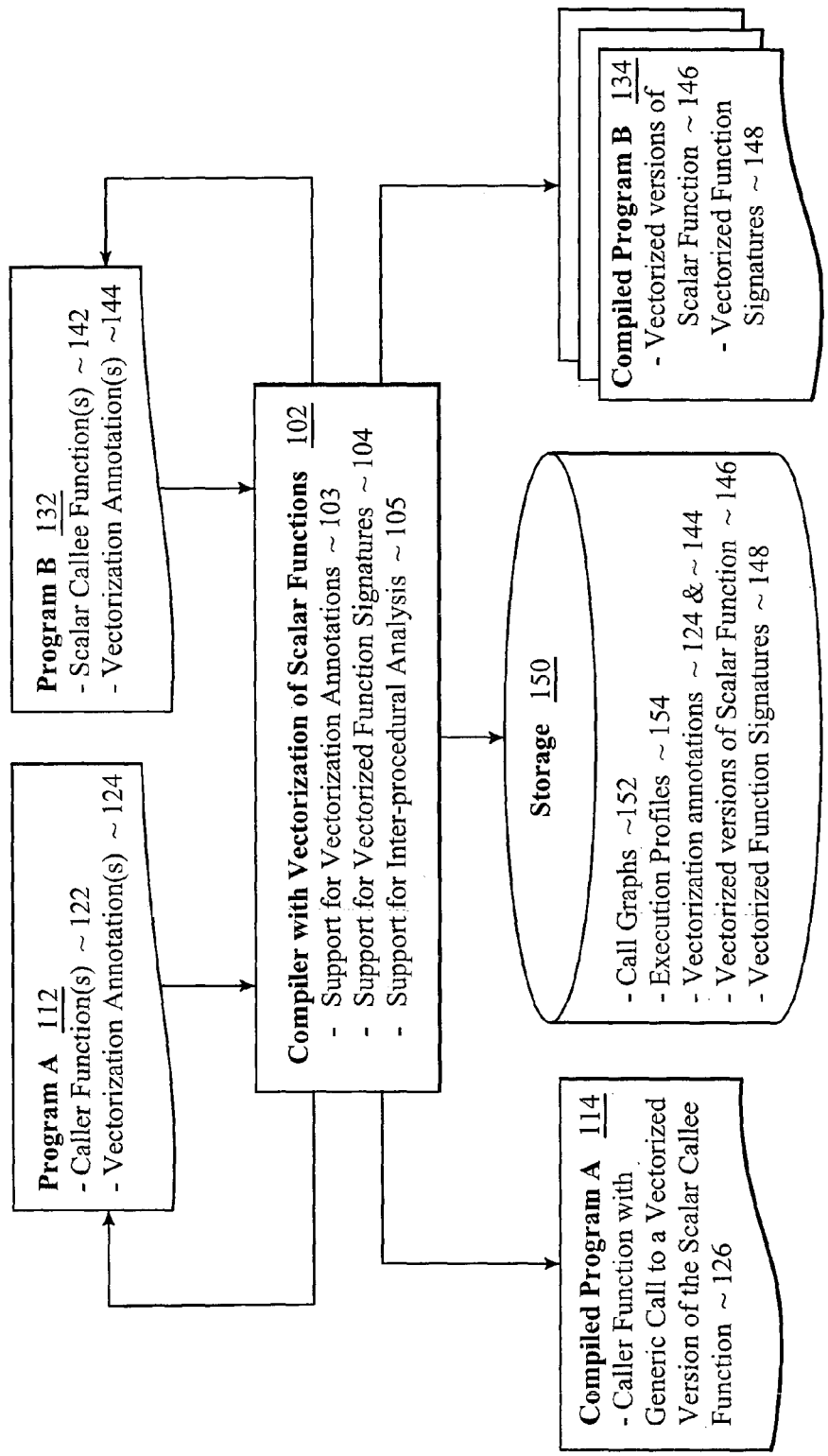
FIG. 1 illustrates an overview of vectorization of scalar functions, in accordance with various embodiments of the present disclosure.

Methods and apparatuses associated with vectorization of scalar functions are disclosed herein. In various embodiments, compiling a first program, on a computing device, may include generating, on the computing device, one or more vectorized versions of a scalar callee function of the first program, based at least in part on vectorization annotations of the first program. Additionally, compiling may include generating one or more vectorized function signatures, on the computing device, respectively associated with the one or more vectorized versions of the scalar callee function. The one or more vectorized function signatures may enable an appropriate vectorized version of the scalar callee function to be matched and invoked for a generic call from a caller function of a second program to a vectorized version of the scalar callee function.

In various embodiments, compiling the callee function may further include on the computing device, generating a call graph or an execution profile of the first and second programs, performing inter-procedural analysis of the first and second programs based at least in part on the call graph and the execution profile, and inserting one or more of the vectorization annotations into the first program, based at least in part on a result of the inter-procedural analysis. Additionally, performing inter-procedural analysis may include analyzing conditional or recursive calls between the caller and the callee function, or struct and multi-dimensional memory accesses of the scalar callee function.

In various embodiments, the vectorization annotations may include one or more of a processor annotation that indicates a processor type or architecture the compiled callee function is to be targeted, a vector length annotation that indicates a vector length for a vectorized version of the scalar callee function, an element size annotation that indicates an element size for defining a vector length for a vectorized version of the scalar callee function, a linear parameter annotation that indicates a step size for serial invocation of a vectorized version of the scalar callee function, a scalar parameter annotation that indicates a value of a scalar parameter is to be broadcast to all execution iterations of a vectorized version of the scalar callee function, a mask or nomask annotation that indicates whether a vectorized version of the scalar callee function is to be masked or not masked, or a scalar function annotation that indicates a user defined function is a particular vector instance of the scalar callee function.

In various embodiments, generating one or more vectorized versions of the scalar callee function may include generating a masked vectorized version of the scalar callee function in response to determination of conditional or recursive call of the scalar callee function, and/or transforming one or more struct or multi-dimensional array memory accesses into one or more unit-stride memory accesses. Further, generating a masked vectorized version of the scalar callee function may include generating a conditional execution construct around a main function body of the scalar callee function to provide for conditional execution of the main function body. Additionally, transforming one or more struct or multi-dimensional array memory accesses into one or more unit-stride memory accesses may include transforming array of struct memory accesses associated with the scalar callee function to struct of array memory accesses, transforming struct of array memory accesses associated with the scalar callee function to array of struct memory accesses, modifying a shape of an array or re-arranging array memory accesses associated with the scalar callee function, employing strided load or store operations to handle non-unit stride or irregular memory accesses, employing gather or scatter hardware support to handle non-unit stride or irregular memory accesses associated with the scalar callee function, and/or expanding a struct associated with the scalar callee function.

In various embodiments, generating a vectorized function signature may include generating a vectorized function signature that includes a targeted processor identifier, a masked or unmasked indicator, a vector length, a linear step size of the corresponding vectorized version of the scalar callee function, a vectorized function signature that includes an original name of the scalar callee function, and/or a single instruction multiple data (SIMD) prefix. The targeted processor identifier may identify a target processor type or architecture of the corresponding vectorized version of the scalar callee function. The masked or unmasked indicator may indicate whether the corresponding vectorized version of the scalar callee function is masked or unmasked. The vector length indicates a length of a vector of the corresponding vectorized version of the scalar callee function. The linear step size may indicate a step size for serial invocation of the corresponding vectorized version of the scalar callee function.

In various embodiments, a method may further include compiling the second program, on a computing device, independent of the compilation of the first program, in response to a request to compile the second program. Additionally, compiling the second program may include replacing a call of the caller function that calls the scalar callee function with a generic call to a vectorized version of the scalar callee function.

Various aspects of the illustrative embodiments will now be further described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation. A feature described in a parenthetical format denotes the feature as an optional feature, e.g., "an instance of (partitions of) an application service," denotes the application service may or may not be "partitioned."

The phrase "in one embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and Q)" The phrase "(A) B" means "(B) or (A B)", that is, A is optional.

FIG. 1 illustrates an overview of vectorization of scalar functions, in accordance with embodiments of the present disclosure. As illustrated, compiler 102 incorporated with the vectorization teachings of the present disclosure, may include support 103 for vectorization annotations, support 104 for vectorized function signatures, and support 105 for inter-procedural analysis. As will be explained in detail below, compiler 102 may be employed to compile program A 112 and program B 132 on a computing device (not shown). As illustrated, program B 132 may include one or more scalar callee functions 142, whereas program A 112 may include one or more caller functions 122 with calls to scalar callee functions 142. Program A 112 and program B 132 may further include vectorization annotations 124 and 144 to guide compiler 102 in vectorizing calls to scalar callee function 142 from caller functions 122 during compilation. Vectorization annotations 124 and 144 may be inserted into program A 112 and program B 132 by a programmer of program A 112 and program B 132, or by compiler 102.

In various embodiments, compiler 102 may compile program A 112 and program B 132, in response to a request or respective requests to compile program A 112 and program B 132. That is, in embodiments, program A 112 and program B 132 may be compiled together or separately. In various embodiments, compilation of program B 132 may include generating, on the computing device, one or more vectorized versions 146 of scalar callee functions 142, based at least in part on vectorization annotations 144. Further, compilation of program B 132 may include generating one or more vectorized function signatures 148, on the computing device, respectively associated with the one or more vectorized versions 146 of scalar callee functions 142. The one or more vectorized function signatures 148 may enable an appropriate vectorized version 146 of the scalar callee functions 142 to be matched and invoked for a generic call from a caller function 126 to a vectorized version 146 of the scalar callee function 142.

In various embodiments, compilation of program B 132 may further include on the computing device, generating call graph 152 or execution profile 154 of the programs A and B 112 and 132, performing inter-procedural analysis of programs A and B 112 and 132 based at least in part on call graph 152 and execution profile 154, and inserting one or more of vectorization annotations 124 and 144 into programs A and B 112 and 132, based at least in part on a result of the inter-procedural analysis. Inter-procedural analysis may include analyzing for conditional or recursive calls between caller and the callee functions 122 and 142, or identifying struct and multi-dimensional memory accesses of scalar callee functions 142.

In various embodiments, generating one or more vectorized versions 146 of scalar callee functions 142 may include generating a masked vectorized version 146 of a scalar callee function 142 in response to determination of conditional or recursive call of the scalar callee function 142 during the inter-procedural analysis. Further, generating one or more vectorized versions 146 of the scalar callee functions 142 may include transforming one or more struct or multi-dimensional array memory accesses of scalar callee functions 142 into one or more unit-stride memory accesses during inter-procedural optimization.

In various embodiments, call graph 152, execution profile 154, vectorized version 146 of the scalar callee functions 142, and vectorized function signatures 148 of the vectorized versions 146 may be stored on storage 150, which may be located on or remotely disposed from the computing device employed to operate compiler 102.

These and other aspects of compiler 102, and compilation of programs A and B 112 and 132, including compilation of caller and callee functions 122 and 142, will be further described below.

FIG. 2 illustrates compiler 102 of FIG. 1 in further detail in accordance with embodiments of the present disclosure. As illustrated, for the embodiments, compiler 102 may include a parser/tokenizer section 202, an analyzer section 204, a code generator section 206, and an optimizer section 208. Further, compiler 102 may be configured to support nominal/non-optimized or optimized compilation. Nominal/non-optimized compilation may be employed e.g., to establish a call graph 152 and/or an execution profile 154 of programs A and B 112 and 132 being compiled. Such call graph 152 and/or execution profile 154 may be employed e.g., in inter-procedural analysis of programs A and B 112 and 132.

Parser/tokenizer section 202 may be configured with logic 212 to parse and/or tokenize source code of programs A and B 112 and 132, including caller and callee functions 122 and 142. In particular, parser/tokenizer section 202 may include logic 214 configured to parse and/or tokenize vectorization annotations 124 and 144 of programs A and B 112 and 132. Analyzer 204 may be configured with logic 216 to analyze programs A and B 112 and 132, including caller and callee functions 122 and 142 being compiled. In particular, analyzer 204 may be configured with logic 218 to support nominal/non-optimized compilation, and to drive the generation of call graph 152 and/or execution profile 154 of programs A and B 112 and 132 being compiled. Further, analyzer 204 may be configured with logic 220 to perform inter-procedural analysis of programs A and B 112 and 132 being compiled. In particular, logic 220 may include logic 222 to determine conditional and/or recursive calls between caller and callee functions 122 and 142, and/or logic 224 to identify struct and multi-dimensional array accesses by scalar callee functions 142.

Code generator 206 may be configured with logic 226 configured to generate executable code for programs A and B 112 and 132 for one or more target execution environments, based on a result of the analysis performed by analyzer 204. Optimizer 208 may be configured with logic 228 to optimize the executable code generated by code generator 206. In particular, logic 228 may include logic 230 to vectorize scalar callee functions 142, generate vectorized versions 146 and their respective signatures 148 as earlier described, and logic 234 to perform inter-procedural optimization. In embodiments, logic 230 may include logic 232 to generate masked versions of the vectorized versions 146 of scalar callee functions 142. Logic 234 may include logic 236 to transform struct and multi-dimensional array memory accesses of scalar callee functions 142 into unit-stride memory accesses.

Figure 3:
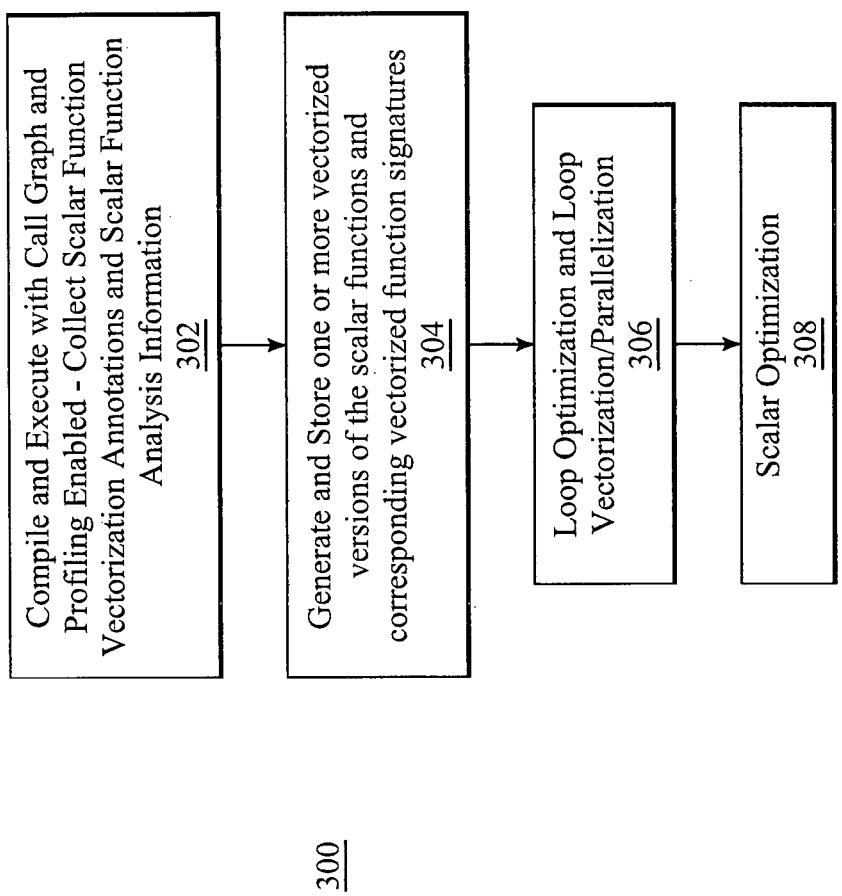
FIG. 3 illustrates a method of vectorizing scalar functions, in accordance with various embodiments of the present disclosure.

FIG. 3 illustrates a method of vectorizing scalar function, in accordance with embodiments of the present disclosure. As illustrated, the method may start at block 302 where program B 132 may be compiled using compiler 102 under e.g., a nominal/non-optimized option, and analyzed, including execution if applicable, to generate call graph 152 and/or execution profile 154 of program B 132. In particular, scalar callee functions 142 may be analyzed, and information about their vectorization annotations 144 may be gathered, including if appropriate, inserting by compiler 102, vectorization annotations 144 into program B 132 being compiled. As described earlier, the analysis may include inter-procedural analysis, in conjunction with program A 112. As described earlier, call graph 152, execution profile 154 and vectorization annotations 144 may be stored in storage 150.

From block 302, the method may proceed to block 304. At block 304, compiler 102 may generate one or more vectorized versions 146 of scalar callee functions 142, and their respective vectorized function signatures 148. As described earlier, generation of the one or more vectorized versions 146 of scalar callee functions 142 may be based at least in part on the vectorization annotations 144 and results of the inter-procedural analysis. Further, generation of the one or more vectorized versions 146 of scalar callee functions 142 may include inter-procedural optimization.

Thereafter, from block 304, the method may proceed to block 306 and then, block 308, where conventional loop optimization and/or loop vectorization/parallelization, block 306, as well as scalar optimization 308, may be performed.

Referring back to block 302, in various embodiments, vectorization annotations 124 and 144 may include one or more of a processor annotation, processor(cpiud), that indicates a processor type or architecture the compiled callee function is to be targeted, a vector length annotation, vectorlength(num), that indicates a vector length for a vectorized version of the scalar callee function, an element size annotation, elementsizeof(type), that indicates an element size for defining a vector length for a vectorized version of the scalar callee function, a linear parameter annotation, linear(param1:step1, param2:step2, . . . , paramN:stepN), that indicates a step size for serial invocation of a vectorized version of the scalar callee function, a scalar parameter annotation, scalar(param1, param2, . . . , paramN), that indicates a value of a scalar parameter is to be broadcast to all execution iterations of a vectorized version of the scalar callee function, a mask or nomask annotation, mask or nomask, that indicates whether a vectorized version of the scalar callee function is to be masked or not masked, or a scalar function annotation, scalar_function(scalar_function_declarator), that indicates a user defined function is a particular vector instance of the scalar callee function.

More specifically, in various embodiments, processor (cpuid) may direct compiler 102 to create a vector version 146 of scalar callee function 142 for the processor type or architecture identified by cpuid. Further, a default processor may be assumed from the implicit or explicit processor- or architecture-specific flag in a command line of compiler 102. In various embodiments, Vectorlength(num) may direct compiler 102 to use vector length (VL) equal to num. Additionally, a default vector length may be computed from the target processor's vector register and the size of the return value (or the first vector parameter if return type is void). For example, if the target processor supports Streaming SIMD Extensions (SSE) with XMM registers (developed by Intel Corporation), and the return type of scalar callee function 142 is int, the default VL may be 4. As a further example, if the target processor supports Advanced Vector Extension (AVX) (also developed by Intel Corporation), the default VL may be 4 if the return type of scalar callee function 142 is int or double, and the default VL may be 8 if the return type of scalar callee function 142 is float. In various embodiments, the VL may be a string literal "big", which directs compiler 102 to generate a "long-vector" version of scalar callee function 142. The "big" version of scalar callee function 142 may have arguments which are pointers to dense arrays of parameter values and dense arrays of return values, rather than having vector values passed/returned in registers. Further, if the caller's parameters and the return value storage are not dense vector, scalar or short-vector versions of scalar callee function 142 may be called instead.

In various embodiments, elementsizeof(type) may direct compiler 102 to use the specified type to define vector length.

For these embodiments, the vector length may be defined as a result of division of the size of SIMD vector register (that is implicitly specified in a processor clause or in a command line) by size of data type specified in the clause. The elementsizeof(type) annotation may be an alternative to the vectorlength(num) annotation. Usage of the elementsizeof(type) annotation may allow having portable code for processors that have SIMD registers of different size, or for different application binary interface (ABI) that have different size for similarly named data types (e.g. long on Windows-64 and Linux-64).

In various embodiments, linear(param1:step1, param2: step2, . . . , paramN:stepN) may inform compiler 102 that the consecutive invocation of scalar callee function 142 in serial execution, with values of param1, param2, . . . , paramN incremented by step1,step2, . . . , stepN, respectively. Further, usage of the linear annotation may be disallowed or rendered void if vector length is as "big." In various embodiments, scalar(param1, param2, . . . , paramN) may inform compiler 102 that values of the specified parameters may be broadcasted to all iterations as a performance optimization.

In various embodiments, mask may direct compiler 102 to generate only masked vectorized version 146 of scalar callee function 142. The vectorization annotation may be used when it is certain that scalar callee function 142 is always conditionally called, for code size optimization. In various embodiments, nomask may direct compiler 102 to generate only non-masked vector version of the function. The vectorization annotation may be used when it is certain that scalar callee function 142 is always unconditionally called, for code size optimization.

In various embodiments, scalar_function(scalar_function_declarator) may inform compiler 102 that the specified user-defined function is a particular vectorized instance 146 of scalar callee function 142. The subroutine name may be changed to conform to subroutine name convention when the vectorized version 146 is auto-generated. This vectorization annotation may allow a programmer to write his/her own specialized vector version.

Still referring to block 302, in various embodiments, the main objective of inter-procedural analysis based on vectorization annotation is to analyze call graph 152 and identify scalar callee functions 142 that may be executed under a vector context, then analyze scalar callee functions 142 to prove scalar callee functions 142 are indeed legal to be executed in a vector context. As an example, consider the following example program

```
#include<stdio.h>
// assume no function annotation __declspec(vector(mask))
int fib(int n)
{ if (n <= 0) return 0;
```

```
if (n == 1) return 1;
else return fib(n−1)+fib(n−2);
}
#define N 1000
int a[N], b[N];
main(int argc, char*argv[ ])
{ int i;
int m = atoi(argv[1]);
for (i=0; i<m; i++) { b[i] = 42; };
for (i=0; i<m; i++) { a[i] = fib(b[i]); };
}
```

In this example, the function "fib" is called in a loop within the main function, as the "fib" is a recursive function, therefore, even when function miming happens, the function "fib" can still exist in the caller. Therefore, it would be preferable for compiler 102 to be able to identify whether:

function "fib" is a function that needs to be vectorized and executed under a vector context, i.e. the loop in the main function for this example, function "fib" is a function that is legal to be called under a vector context, i.e. fib does not introduce any lexically-backward dependencies on the caller sites, and function "fib" could be called under a condition or not.

Since the programs having the caller and callee functions can be in different files (or compilation units), accordingly in various embodiments, compiler 102 may be configured to perform inter-procedural analysis to analyze call graph 152 and the programs to determine the questions illustrated by the above examples. In various embodiments, an eager function vectorization approach may be employed, e.g., whenever compiler 102 compiles a scalar callee function 142, compiler 102 may be configured to generate the "vector" annotation so long it is legal to be vectorized. In other embodiments, a lazy function vectorization approach may be employed, e.g., compiler 102 may be configured to trigger the function annotation phase whenever compiler 102 fails to vectorize a loop due to function calls inside the loop. Each approach has pros and cons. In various embodiments, an hybrid approach may be employed, e.g., if the scalar callee function is a small scalar callee function, the "eager" approach is employed, however, if the scalar callee function is a relatively large scalar callee function, the "lazy" approach is employed. Accordingly, a reasonable tradeoff in terms of compile-time and code size, if desirable, may be achieved.

Referring now to block 304, generating a masked vectorized version 146 of a scalar callee function 142 may include generating a conditional execution construct around a main function body of the scalar callee function 142 to provide for conditional execution of the main function body. In various embodiments, the conditional execution construct may include introduction of a Boolean variable mask for execution condition testing. Consider the following example, where the original function shown in column [A] may be vectorized with mask and masked body as shown in column [C]. The intermediate masked body is shown in column [B].

| (A) Original function | (B) Intermediate masked body | (C) Vectorized function with mask and masked body |
|---|---|---|
| int foo( ) { int | int foo_masked(bool mask) { int | int_vector vec_foo_masked(bool vector mask) { |

-continued

```
retval;                 retval;                        vector_int retval;
    do                      if (mask)                  vector_if (mask) {
calculations;               {                              do
    retval                      do                     vector_calculations;
= ...;                      calculations;                  retval = ...;
    return                      retval                 }
retval;                     = ...;                     else {
}                       }                                  retval =
                        else {                         vector_int(0);
                            retval                     }
                        = 0;                           return retval;
                        }                              }
                        return
                        retval;
                        }
```

(D) Vectorized function with mask and masked body using Intel ® 128-bit SSE

```
__m128i vec_foo_masked(__m128i mask)
{ __m128i retval; int mask_bits = _mm_movemask_epi8(mask);
    if (mask_bits) {           // don't execute body at all if all
bits are 0
        do vector_calculations;    // note, the calculations check
corresponding bits of mask
            retval = ...;
    }
    else { retval = _mm_xor_sil28(ret_val, ret_val); }
    return ret_val;
}
```

| (E) Original scalar loop | (F) Vectorized loop pseudo-code |
|---|---|
| ```for ( i=0; I < n; i++) {     if (c[i] < 0) {         a[i] = foo( );     } }``` | ```for ( i=0; i < n; i += vector_length) {     mask_bits = (vector_c[i] < vector_0);     vector_temp_a = vec_foo_masked(mask_bits),     vector_a[i] = masked_store(vector_temp_a, mask-bits); }``` |

In the above example, the vectorized function body with masking from column (C) in case of vectorization with Intel® SSE 128-bit instructions may look like the pseudo-code shown in column (D). Further, if the program with the caller function has a serial loop that includes a function call under condition in the loop, as shown in column (E), vectorization may be performed in a way that generates vector_mask for array c, calling the vector version of function foo, and masked_vector_store to array vector_a which is actually a[i: i+vector_length], as shown in column (F).

Still referring to block 304, transforming one or more struct or multi-dimensional array memory accesses into one or more unit-stride memory accesses may include a mixed strategy of different methods, transforming array of struct memory accesses associated with the scalar callee function to struct of array memory accesses, transforming struct of array memory accesses associated with the scalar callee function to array of struct memory accesses, modifying a shape of an array or re-arranging array memory accesses associated with the scalar callee function, employing strided load or store operations to handle non-unit stride or irregular memory accesses, employing gather or scatter hardware support to handle non-unit stride or irregular memory accesses associated with the scalar callee function, and/or expanding a struct associated with the scalar callee function. Each method covers certain code and data structures, and the methods have different compile-time cost and requirements on the SIMD hardware support. In various embodiments, compiler 102 may be configured to implement a unified scheme as illustrated in column (G) below to handle different cases.

(G) Unified scheme for handle struct and multi-dimensional array access for vectorization

```
For each memory reference inside the vector-function/loop {
    unitStrideAccess = FALSE;
    switch (type of struct/array memory access) {
        case AOS: Invoke method A;    // SOA: Array of Struct
                if success, unitStrideAccess = TRUE;
                break;
        case SOS: Invoke method D;    // SOS: Scalar of Struct
                if SOA is created, unitStrideAccess = TRUE;
                break;
        case MDA: Invoke method B;    // MDA: Multi-Dim Array
                If success, unitStrideAccess = TRUE;
                break;
        case SDA: Check if the access is unitStrideAccess; //
SDA: Single-Dim Array
                If success, unitStrideAccess = TRUE;
        default:   break;
    }
    if (unitStrideAcess)
    Generate vectorized code with unit-stride access;
    else {
        Invoke method C;
    }
}
```

In general, due to method A (case AOS) requires the global program analysis to convert the date structure from AOS to SOA and program structure in a significant way (e.g. g[i]→m to g→m[i]) in all places referring the original "struct", method A may have limited applicability and use scope and higher compile-time cost. Accordingly, in various embodiments, compiler 102 may be configured to perform interprocedural optimization based global program analysis and transformation to potentially achieve a higher optimization level. In various embodiments, for a lower optimization level, compiler 102 may be configured to apply the local analysis only to justify the legality for AOS to SOA transformation, and if the determination of legality failed, method C may be invoked. The example shown below in columns (H) and (I) illustrates the code generated by method C and D. The method D (case SOS) may be invoked to expand "p" which is a Scalar Of Struct (SOS) to AOS "vector_p[VL]" (or it can be expanded to a SOA, i.e. the field of "p" could be expanded to vector_x[VL], vector_y[VL]), where VL denotes the vector length. The "vector_gather" and "vector_scatter" may be implemented with either hardware strided_load/strided_store instructions or hardware vgather/vscatter instructions on processors with AVX architecture.

---

(H) Original scalar loop

```
#include<stdio.h>
#define N 100
typedef struct {
  int x; int y;
} perm_t;
struct smat_struct {
  unsigned int m; int n; double a[N];
};
typedef struct smat_struct smat_t;
_declspec(noinline, vector)//file bbb.c
double maddmul(smat_t *g, perm_t p)
{  int m = g->m + g->n;
   return ((m + p->x + p->y)*
           g->a[g->n]);
}
int main( ) // file aaa.c
{  smat_t g[N] ;
   perm_t p;
   double x = 0.0;
   for (int i = 0; i<N; i++) {
     p.x = i; p.y = i;
     g[i].m = i;
     g[i].n = i;
     g[i].a[i] = i;
     x = x + maddmul(&g[i], p);
   }
   printf("x = %f\n", x);
}
```

---

(I) Vectorized function and caller loop pseudo-code

```
#include<stdio.h>
#define N 100
typedef struct {
  int x; int y;
} perm_t;
struct smat_struct {
  unsigned int m; int n; double a[N];
};
typedef struct smat_struct smat_t;
double_vector vector_maddmul(smat_t *g, erm_t *p)
{  vector_m = vector_gather[g->m,
                  g+1*sizeof(smat_t)->m,
                  g+2*sizeof(smat_t)->m
                  g+(VL-1)*sizeof(smat_t)->m)
   vector_n = vector_gather [g->n, ... ...]
   vector_x = vector_gather [p->x,
                  p+1*sizeof(perm_t)->x,
                  p+2*sizeof(perm_t)->x
                  p+(VL-1)*sizeof(perm_t)->n)
   vector_y = vector_gather [p->y, ... ...];
   vector_g_a = vector_gather [g->a[g->n],
                  g+1*sizeof(smat_t)->a[g->n],
                  g+2*sizeof(smat_t)->a[g->n],
                  g+(VL-1)*sizeof(smat_t)->a[g->n])
```

```
   vector_m = vector_m + vector_n
   vector_temp = (vector_m+vector_x+vector_y)* vector_g_a
   return (vector_temp);
}
int main( )
{  smat_t g[N]; perm_t vector_p[VL]; double x = 0.0;
   ....
   vector_for (int i = 0; i<N; i = i + VL) {
     vector_p[0:VL].x = vector_scatter[i, i+1, ... i+VL]
     vector_p[0:VL].y = vector_scatter[i, i+1, ...i+VL]
     g[i:i+VL].m = vector_scatter[i, i+1, ... i+VL]
     g[i:i+VL].n = vector_scatter[i, i+1, ... i+VL]
     g[i:i+VL].a[i] = vector_scatter[i, i+1, ... i+VL];
     vector_x = vector_x + maddmul(&g[i], &vector_p[0])
   }
   x = x + vector_horizontal_add(vector_x);
   ... ... // remainder scalar loop
   printf("x = %f\n", x);
}
```

---

Referring now also to FIG. 4, in various embodiments, generating a vectorized function signature 148 at block 304 may include generating a vectorized function signature 146 that includes a targeted processor identifier 406, a masked or unmasked indicator 410, a vector length 408, a linear step size 412 of the corresponding vectorized version 146 of the scalar callee function 142, an original name 402 of the scalar callee function 142, and/or a single instruction multiple data (SIMD) prefix 404. The targeted processor identifier 406 may identify a target processor type or architecture of the corresponding vectorized version 146 of the scalar callee function 142. The masked or unmasked indicator 410 may indicate whether the corresponding vectorized version 146 of the scalar callee function 142 is masked or unmasked. The vector length 408 indicates a length of a vector of the corresponding vectorized version 146 of the scalar callee function 142. The linear step size 412 may indicate a step size for serial invocation of the corresponding vectorized version 146 of the scalar callee function 142.

Consider the example below with two vectorization annotations (declspec) for the scalar function "set_b." In various embodiments, compiler 102 may be configured to generate two vectorized versions based the scalar function "set_b", one is a vectorized version of the scalar function for processor "Atom", and another vectorized version of the scalar function for processor target "Core_i7_sse4_2".

---

```
_declspec(vector(processor(atom), mask, scalar(x), linear(k:1),
vectorlength(4)))
_declspec(vector(processor(core_i7_sse4_2), scalar(x),
linear(k:1), vectorlength(4)))
extern int set_b(int k, int x)
{ a[k] = a[k] + x;
  return a[k];
}
```

---

As described, besides generating the different versions of the scalar callee function, compiler 102 may be configured to also generate the corresponding function names encoded with the vectorized function signatures 148 described. For this example, the vectorized function signatures 148 may be as follow:

_set_b._simdsimd_B4m_l1_s1 for Atom processor annotation

_set_b._simdsimd_H4n_l1_s1 for Core_i7_sse4_2 processor annotation where "set_b" is the original name, "simdsimd" is the prefix of the vectorized version of the scalar function, "B"

indicates the Atom processor target, H indicates the core-i7 processor target, "4" indicates the vector length, "m" indicates that the vectorized version is a masked version", "n" indicates that the vectorized version is an unmasked version, "ll" indicates linear(k:1), and "sl" indicates scalar(x).

As described earlier, the vectorized function signatures enable compiler 102 to compile programs A and B 112 and 132 separately in different files or compilation units, by using function prototype or header files to communicate function annotation information. Compiler 102 may signature match while generating vectorized code at caller sites. Besides generating a vectorized function signature 148 for each vectorized version 146 of a scalar callee function 142 during the compilation, compiler 102 may also be configured to generate a function body for each scalar callee function 142 with uniquely mangled function name based on the vectorized function signatures 148. The function parameters and return results may be converted to accommodate target architectures, the vector width of function parameters may be derived from parameter's scalar type and their vector properties linear and scalar (invariant) parameters including memory addresses, which may require multiple vector registers to represent one parameter passed in as vector value composed on the caller sides, or passed in as scalar value.

Accordingly, in various embodiments, a method may further include compiling program A 112, on a computing device, independent of the compilation of program B 132, in response to a request to compile program A 112. Additionally, compiling program A 112 may include replacing a call 122 from a caller function of program A 112 that calls scalar callee function 142 with a generic call 126 to a vectorized version 146 of scalar callee function 142.

Figure 5:
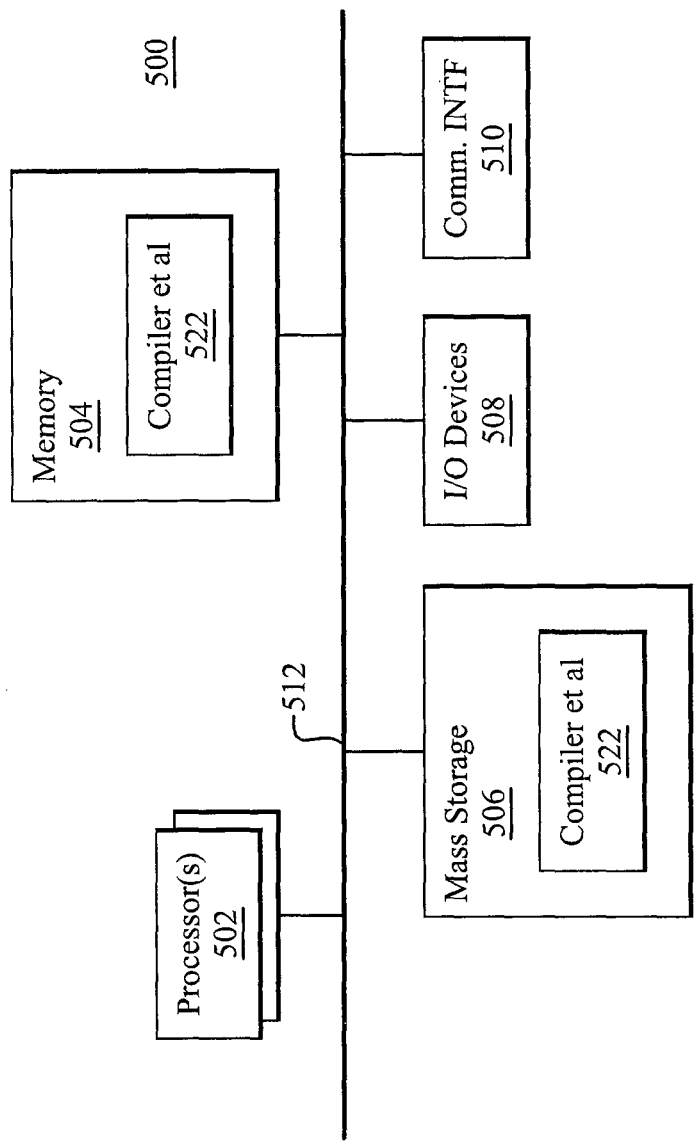
FIG. 5 illustrates an example computer system suitable for practicing vectorization of scalar functions, in accordance with various embodiments of the present disclosure.

FIG. 5 illustrates an example computer system suitable for practicing vectorization of scalar functions, in accordance with various embodiments of the present disclosure. As shown, computing system 500 includes a number of processors or processor cores 502, and system memory 504. For the purpose of this application, including the claims, the terms "processor" and "processor cores" may be considered synonymous, unless the context clearly requires otherwise. In embodiments, processors 502 may be SIMD processors with SIMD registers. Additionally, computing system 500 includes mass storage devices 506 (such as diskette, hard drive, compact disc read only memory (CDROM) and so forth), input/output devices 508 (such as display, keyboard, cursor control and so forth) and communication interfaces 510 (such as network interface cards, modems and so forth). The elements are coupled to each other via system bus 512, which represents one or more buses. In the case of multiple buses, they are bridged by one or more bus bridges (not shown).

Each of these elements performs its conventional functions known in the art. In particular, system memory 504 and mass storage 506 may be employed to store a working copy and a permanent copy of the programming instructions implementing compiler 102 and related routines, herein collectively denoted as 522. The various components of compiler and their related routines 522 may be implemented by assembler instructions supported by processor(s) 502 or high-level languages, such as, for example, C, that can be compiled into such instructions.

The permanent copy of the programming instructions may be placed into permanent storage 506 in the factory, or in the field, through, for example, a distribution medium (not shown), such as a compact disc (CD), or through communication interface 510 (from a distribution server (not shown)). That is, one or more distribution media having an implementation of the agent program may be employed to distribute the agent and program various computing devices. Mass storage 506 may also be employed as storage 150 of FIG. 1.

The constitution of these elements 502-512 are known, and accordingly will not be further described.

Figure 6:
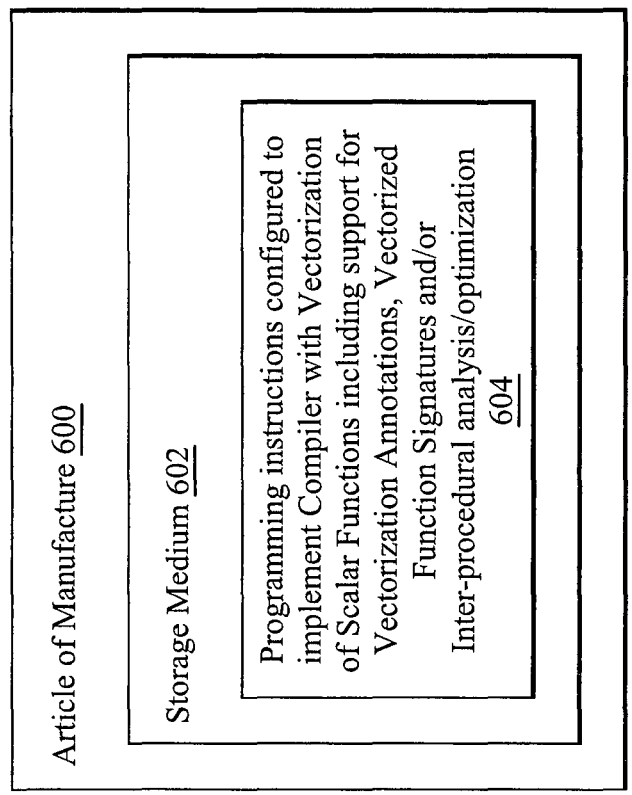
FIG. 6 illustrates an article of manufacture having programming instructions configured to cause an apparatus to practice vectorization of scalar functions, in accordance with embodiments of the present disclosure.

FIG. 6 illustrates an article of manufacture with programming instructions configured to enable an apparatus to practice vectorization of scalar functions, in accordance with embodiments of the present disclosure. As shown, article of manufacture 600 may include computer-readable non-transitory storage medium 602. Storage medium 602 may include programming instructions 604 configured to implement compiler 102 of FIG. 1.

Storage medium 602 represents a broad range of persistent storage medium known in the art, including but are not limited to flash memory, optical or magnetic disks. Programming instructions 604, in particular, may enable an apparatus, in response to their execution by the apparatus to perform operations including:
  receiving a request to compile a first program with a scalar callee function and vectorization annotations, and
  compiling, in response to the request, the first program,
  wherein compiling the first program includes generating one or more vectorized versions of the scalar callee function based at least in part on the vectorization annotations, and generating one or more vectorized function signatures respectively associated with the one or more vectorized versions of the scalar callee function, and
  wherein the one or more vectorized function signatures are configured to enable an appropriate one of the one or more vectorized versions of the scalar callee function to be matched and invoked for a generic call from a caller function of a second program to a vectorized version of the scalar callee function.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present invention. This application is intended to cover any adaptations or variations of the embodiments discussed herein. Therefore, it is manifestly intended that the embodiments of the present invention be limited only by the claims and the equivalents thereof.

What is claimed is:

1. A method, comprising:
  receiving, on a computing device, a request to compile a first program with a scalar callee function and vectorization annotations; and
  compiling, on the computing device, in response to the request, the first program;
  wherein compiling the first program includes generating one or more vectorized versions of the scalar callee function based at least in part on the vectorization annotations, and generating one or more vectorized function signatures respectively associated with the one or more vectorized versions of the scalar callee function; and
  wherein the one or more vectorized function signatures are configured to enable the one or more vectorized versions of the scalar callee function to be matched and selectively invoked for a generic call from a caller function of a second program to a vectorized version of the scalar callee function.

2. The method of claim 1, further comprises
  generating, on the computing device, a call graph or an execution profile of the first and second programs;

performing, on the computing device, inter-procedural analysis of the first and second programs based at least in part on the call graph and the execution profile; and inserting one or more of the vectorization annotations into the first program, on the computing device, based at least in part on a result of the inter-procedural analysis.

3. The method of claim 2, wherein performing inter-procedural analysis comprises analyzing conditional or recursive calls between the caller and the callee functions, or struct and multi-dimensional memory accesses of the scalar callee function.

4. The method of claim 1, wherein the vectorization annotations comprise one or more of a processor annotation that indicates a processor type or architecture the compiled scalar callee function is to be targeted, a vector length annotation that indicates a vector length for a vectorized version of the scalar callee function, an element size annotation that indicates an element size for defining a vector length for a vectorized version of the scalar callee function, a linear parameter annotation that indicates a step size for serial invocation of a vectorized version of the scalar callee function, a scalar parameter annotation that indicates a value of a scalar parameter is to be broadcast to all execution iterations of a vectorized version of the scalar callee function, a mask or nomask annotation that indicates whether a vectorized version of the scalar callee function is to be masked or not masked, or a scalar function annotation that indicates a user defined function is a particular vector instance of the scalar callee function.

5. The method of claim 1, wherein generating one or more vectorized versions of the scalar callee function comprises generating a masked vectorized version of the scalar callee function in response to determination of conditional or recursive call of the scalar callee function.

6. The method of claim 5, wherein generating a masked vectorized version of the scalar callee function comprises generating a conditional execution construct around a main function body of the scalar callee function to provide for conditional execution of the main function body.

7. The method of claim 1, wherein generating a vectorized version of the scalar callee function comprises transforming one or more struct or multi-dimensional array memory accesses into one or more unit-stride memory accesses.

8. The method of claim 7, wherein transforming one or more struct or multi-dimensional array memory accesses into one or more unit-stride memory accesses comprises transforming array of struct memory accesses associated with the scalar callee function to struct of array memory accesses;

transforming struct of array memory accesses associated with the scalar callee function to array of struct memory accesses;

modifying a shape of an array or re-arranging array memory accesses associated with the scalar callee function;

employing strided load or store operations to handle non-unit stride or irregular memory accesses;

employing gather or scatter hardware support to handle non-unit stride or irregular memory accesses associated with the scalar callee function; or expanding a struct associated with the scalar callee function.

9. The method of claim 1, wherein generating a vectorized function signature comprises generating a vectorized function signature that includes a targeted processor identifier, a masked or unmasked indicator, a vector length, or a linear step size of the corresponding vectorized version of the scalar callee function;

wherein the targeted processor identifier identifies a target processor type or architecture of the corresponding vectorized version of the scalar callee function, the masked or unmasked indicator indicates whether the corresponding vectorized version of the scalar callee function is masked or unmaksed, the vector length indicates a length of a vector of the corresponding vectorized version of the scalar callee function, and the linear step size indicates a step size for serial invocation of the corresponding vectorized version of the scalar callee function.

10. The method of claim 9, wherein generating a vectorized function signature further comprises generating a vectorized function signature that includes an original name of the scalar callee function, or a single instruction multiple data (SIMD) prefix.

11. The method of claim 1, further comprises compiling the second program, on a computing device, independent of the compilation of the first program, in response to a request to compile the second program.

12. The method of claim 11, wherein compiling the second program includes replacing a call from a caller function of the second program that calls the scalar callee function of the first program with a generic call to a vectorized version of the scalar callee function.

13. At least one computer-readable non-transitory storage medium having a plurality of programming instructions stored therein, and configured to cause an apparatus, in response to execution of the programming instructions by the apparatus, to:

receive a request to compile a first program with a scalar callee function and vectorization annotations, and compile, in response to the request, the first program, wherein compile the first program includes generation of one or more vectorized versions of the scalar callee function based at least in part on the vectorization annotations, and generation of one or more vectorized function signatures respectively associated with the one or more vectorized versions of the scalar callee function, and wherein the one or more vectorized function signatures are configured to enable the one or more vectorized versions of the scalar callee function to be matched and selectively invoked for a generic call of a caller function of a second program to a vectorized version of the scalar callee function.

14. The storage medium of claim 13, wherein the apparatus is further caused to:

generate a call graph or an execution profile of the first and second programs;

perform inter-procedural analysis of the first and second programs based at least in part on the call graph and the execution profile, wherein perform inter-procedural analysis comprises analysis of conditional or recursive calls between the caller and the callee functions, or struct and multi-dimensional memory accesses of the scalar callee function; and insert one or more of the vectorization annotations into the first program, based at least in part on a result of the inter-procedural analysis.

15. The storage medium of claim 13, wherein the vectorization annotations comprise one or more of a processor annotation that indicates a processor type or architecture the compiled callee function is to be targeted, a vector length annotation that indicates a vector length for a vectorized version of the scalar callee function, an element size annotation that indicates an element size for defining a vector length for a vectorized version of the scalar callee function, a linear parameter annotation that indicates a step size for serial invocation of a vectorized version of the scalar callee function, a scalar parameter annotation that indicates a value of a scalar parameter is to be broadcast to all execution iterations of a vectorized version of the scalar callee function, a mask or nomask annotation that indicates whether a vectorized version of the scalar callee function is to be masked or not masked, or a scalar callee function annotation that indicates a user defined function is a particular vector instance of the scalar callee function.

16. An apparatus, comprising:
one or more processors;
a storage medium coupled to the one or more processors, including a compiler configured to be executed by the one or more processors to:
receive a request to compile a first program with a scalar callee function and vectorization annotations, and
compile, in response to the request, the first program;
wherein compilation of the first program includes generation of one or more vectorized versions of the scalar callee function based at least in part on the vectorization annotations, and generation of one or more vectorized function signatures respectively associated with the one or more vectorized versions of the scalar callee function, and
wherein the one or more vectorized function signatures are configured to enable the one or more vectorized versions of the scalar callee function to be matched and selectively invoked for a generic call from a caller function of a second program to a vectorized version of the scalar callee function.

17. The apparatus of claim 16, wherein generation of one or more vectorized versions of the scalar callee function comprises generation of a masked vectorized version of the scalar callee function in response to determination of conditional or recursive call of the scalar callee function, or transformation of one or more struct or multi-dimensional array memory accesses into one or more unit-stride memory accesses.

18. The apparatus of claim 17, wherein generation of a masked vectorized version of the scalar callee function comprises generation of a conditional execution construct around a main function body of the scalar callee function to provide for conditional execution of the main function body.

19. The apparatus of claim 17, wherein transformation of one or more struct or multi-dimensional array memory accesses into one or more unit-stride memory accesses comprises
transformation of array of struct memory accesses associated with the scalar callee function to struct of array memory accesses;
transformation of struct of array memory accesses associated with the scalar callee function to array of struct memory accesses;
modification of a shape of an array or re-arrangement of array memory accesses associated with the scalar callee function;
employment of strided load or store operations to handle non-unit stride or irregular memory accesses;
employment of gather or scatter hardware support to handle non-unit stride or irregular memory accesses associated with the scalar callee function; or
expansion of a struct associated with the scalar callee function.

20. The apparatus of claim 16, wherein generation of a vectorized function signature comprises generation of a vectorized function signature that includes a targeted processor identifier, a masked or unmasked indicator, a vector length, or a linear step size of the corresponding vectorized version of the scalar callee function;
wherein the targeted processor identifier identifies a target processor type or architecture of the corresponding vectorized version of the scalar callee function,
the masked or unmasked indicator indicates whether the corresponding vectorized version of the scalar callee function is masked or unmaksed,
the vector length indicates a length of a vector of the corresponding vectorized version of the scalar callee function, and
the linear step size indicates a step size for serial invocation of the corresponding vectorized version of the scalar callee function.

* * * * *